Figure 1:
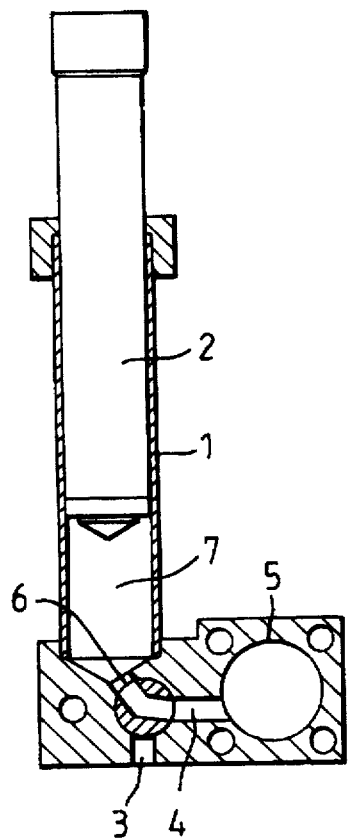

United States Patent [19]

Binley

[11] Patent Number: 5,718,354
[45] Date of Patent: Feb. 17, 1998

[54] HANDLING MATERIALS

[75] Inventor: Gary Norman Binley, Northampton, United Kingdom

[73] Assignee: Good Humor Corporation, Englewood Cliffs, N.J.

[21] Appl. No.: 611,027

[22] Filed: Mar. 5, 1996

Related U.S. Application Data

[63] Continuation of Ser. No. 206,773, Mar. 7, 1994, abandoned.

[30] Foreign Application Priority Data

Mar. 8, 1993 [EP] European Pat. Off. ............. 93301713

[51] Int. Cl.$^6$ ........................................... B61B 7/00
[52] U.S. Cl. ................................... 222/1; 222/309
[58] Field of Search ........................ 222/1, 309, 380; 366/101, 189

[56] References Cited

U.S. PATENT DOCUMENTS

| | | | |
|---|---|---|---|
| 2,132,364 | 10/1938 | Thompson | 62/69 |
| 3,661,303 | 5/1972 | Prosenbauer | 222/309 |
| 3,710,538 | 1/1973 | Lowy et al. | 53/22 R |
| 4,351,849 | 9/1982 | Meade | 426/61 |
| 4,412,428 | 11/1983 | Giannella et al. | 62/308 |
| 4,566,612 | 1/1986 | von Kreuter | 222/309 |
| 4,787,534 | 11/1988 | Cillario | 222/130 |
| 4,793,151 | 12/1988 | Masel et al. | 62/306 |
| 5,208,050 | 5/1993 | Ney | 425/202 |
| 5,246,175 | 9/1993 | Feldpausch | 241/101.8 |

FOREIGN PATENT DOCUMENTS 0 539 646  5/1993  European Pat. Off.
2 006 597  5/1979  United Kingdom.

*Primary Examiner*—Andres Kashnikow
*Assistant Examiner*—Lisa Ann Douglas
*Attorney, Agent, or Firm*—James J. Farrell

[57] ABSTRACT

Reproducible volumes of aerated material, e.g. ice confections, are disposed on a continuous basis by compressing a quantity to a predetermined volume and releasing the pressure before dispensing.

3 Claims, 1 Drawing Sheet

HANDLING MATERIALS

This is a continuation application of Ser. No. 08/206,773, filed Mar. 7, 1994, now abandoned.

FIELD OF THE INVENTION

This invention relates to the handling of materials and, in particular, to handling of aerated compositions to provide reproducible volumes of these compositions on a continuous basis.

BACKGROUND OF THE INVENTION

Dispensing of reproducible volumes of aerated material presents difficulties because such material can be expected to distort in shape and undergo changes in volume during handling. These problems result from the aeration, in the form of bubbles, being capable of changing volume when subjected to small, even localized, pressure changes. This problem is particularly found with frozen ice confections because these compositions are aerated and comprise a complex structure containing fats, or fat replacers, and water in addition to milk derived solids. These confections, which include ice cream, ice milks, frozen yoghurts and frozen custards, require careful handling at low temperatures, ie. below 0° C., to retain their structure. Aerated chocolate is another example of a material which will change volume under pressure.

Additionally change of pressure and the consequent change in volume will often be associated with variations in viscosity. Therefore an aerated material will show different flow rates when subjected to pressure.

LITERATURE

U.S. Pat. No. 4,566,612 (Kreuter) describes the dispensing of ice cream using a flexible flap valve. Oakes (GB 2006597) describes production of a cellular product, e.g. aerated chocolate, and dispensing it via an orifice carried on a piston. An apparatus for dispensing meringue is shown in EPA 0539646 (Ferrero) and a machine for delivering metered quantities of fluid or semi-fluid substances described in U.S. Pat. No. 4,787,534 (Ferrero).

Ice confections have been well characterised in the literature and general disclosures will be found in Arbuckle and J Soc Dairy Technology 1990, 43(1), pp 17–20.

GENERAL DESCRIPTION OF THE INVENTION

Dispensing of aerated materials, preferably food materials, is achieved, according to the present invention, by compressing the material under pressure to a predetermined volume in which the bubbles are reduced to a volume which effectively removes errors in measurement. Thus the invention comprises a method of dispensing reproducible amounts of an aerated deformable composition comprising the steps of:

i) introducing the composition under pressure into a first volume, ii) allowing this first volume to expand to a second volume at which the pressure of aeration is ambient, and iii) dispensing the second volume of aerated composition.

The method of the invention is particularly applicable to aerated foods materials.

A preferred form of allowing the first volume to expand to the second volume is to have a piston movable within a cylinder. The ice confections, to which the method is particularly applicable, will usually have an over-run in the range from 50% to 200%.

The present invention is particularly valuable when several dosing units feed from a single manifold. Variation in equipment will not affect the volume dosed from each unit because the volume of aerated material in the expandable volume is isolated from the manifold feed.

SPECIFIC DESCRIPTION OF THE INVENTION

Figure 2:
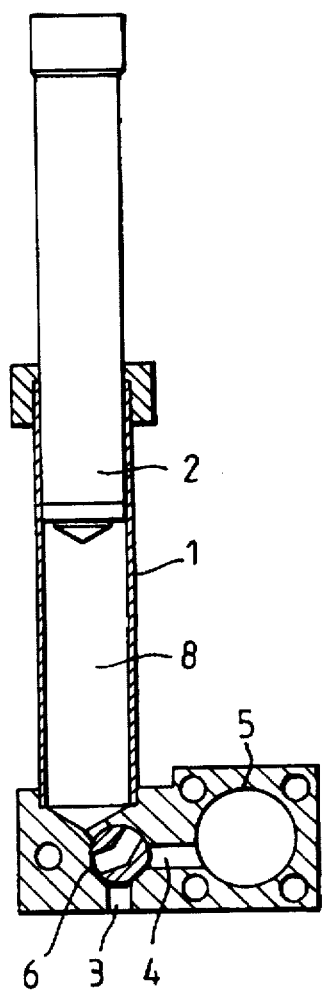
Figure 3:
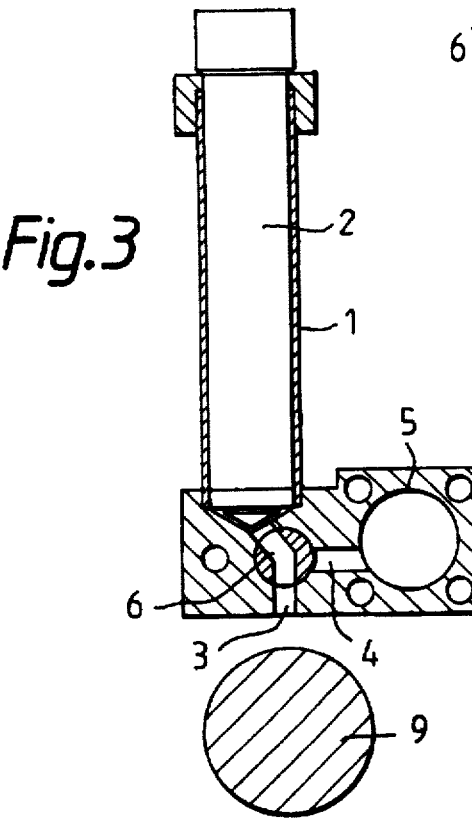

An example of the method of the invention will now be given to illustrate, but not limit the invention, referring to the accompanying diagrammatic drawings in which:

FIGS. 1 to 3 show sequences in the operation of a device to displace aerated material.

In FIG. 1 a piston 2 is slidable within cylinder 1 and material is supplied to the cylinder volume via inlet conduit 4 from inlet manifold 5. Material passes from conduit 4 into the cylinder 1 through changeover valve 6 and leaves the cylinder through valve 6 when rotated. This valve may be of any convenient design and could comprise two separately operated valves. The conduit 4 and manifold 5 contain aerated material under pressure. Material passes from the cylinder via valve 6 and exit conduit 3.

In FIG. 1 valve 6 is open to allow material into the cylinder to occupy a measured first volume 7. On closing valve 6 (see FIG. 2) first volume 7 is held isolated in the cylinder under a known pressure. For an ice confection this pressure would be 5 to 6 bar so that the aeration gas is compressed to $\frac{1}{5}$ or $\frac{1}{6}$ of its original volume.

Piston 2 is then moved along the cylinder—see FIG. 2—to allow the compressed aerated material to expand to fill second volume 8. In this volume the aeration gas is under ambient pressure, which will usually be atmospheric. Thus the second volume is occupied by a predetermined volume of aerated material. This volume 8 is obtained by measuring the ice confection into volume 7 under a known pressure.

On rotating valve 6 to communicate with conduit 3—see FIG. 3—and moving piston 2 along cylinder 1 the aerated material in the second volume forms a portion 9. This portion 9 separates from the device when the piston reaches the end of its travel and valve 6 closes.

The ice confection had an over-run of 100%. The portion 9 could be dispensed into an appropriate mould or an edible container, e.g. a chocolate shell.

I claim:

1. A method of dispensing reproducible amounts of an aerated deformable composition comprising the steps of:

(i) compressing the aerated composition under pressure into a first volume to form a compressed aerated composition;

(ii) allowing the first volume of compressed aerated composition to expand to a second volume thereby lowering the pressure of the compressed aerated composition to ambient pressure to form a second volume of aerated composition; and (iii) dispensing the second volume of aerated composition.

2. A method according to claim 1, wherein the first volume is allowed to expand by movement of a piston within a cylinder.

3. A method according to claim 1, wherein the aerated composition is an ice confection having an over-run in the range from 50% to 200%.

* * * * *